US005602936A

United States Patent [19]

Green et al.

[11] Patent Number: 5,602,936
[45] Date of Patent: Feb. 11, 1997

[54] METHOD OF AND APPARATUS FOR DOCUMENT DATA RECAPTURE

[75] Inventors: W. Thomas Green, Carrollton; R. Keith Lynn, Roswell, both of Ga.

[73] Assignee: Greenway Corporation, Carrollton, Ga.

[21] Appl. No.: 394,570

[22] Filed: Feb. 27, 1995

Related U.S. Application Data

[63] Continuation-in-part of Ser. No. 237,757, May 4, 1994, abandoned, which is a continuation-in-part of Ser. No. 6,543, Jan. 21, 1993, abandoned.

[51] Int. Cl.⁶ .................................................. G06K 9/00
[52] U.S. Cl. ................................................ 382/140; 382/305
[58] Field of Search ........................................... 382/137, 138, 382/139, 140, 305, 306; 235/379; 364/401, 408

[56] References Cited

U.S. PATENT DOCUMENTS

| | | | |
|---|---|---|---|
| 3,402,299 | 9/1968 | Held | 250/557 |
| 3,800,078 | 3/1974 | Cochran et al. | 358/482 |
| 4,205,780 | 6/1980 | Burns et al. | 235/454 |
| 4,264,808 | 4/1981 | Owens et al. | 235/379 |
| 4,396,902 | 8/1983 | Warthan et al. | 382/320 |
| 4,510,619 | 4/1985 | LeBrun et al. | 382/306 |
| 4,672,186 | 6/1987 | Van Tyne | 235/470 |
| 4,710,963 | 12/1987 | Chapman et al. | 382/112 |
| 4,743,974 | 5/1988 | Lockwood | 358/494 |
| 4,821,332 | 4/1989 | Durham | 382/140 |
| 4,855,580 | 8/1989 | Van Maanen, Jr. | 235/440 |
| 4,888,812 | 12/1989 | Dinan et al. | 382/140 |
| 4,908,719 | 3/1990 | Nonoyama | 358/494 |
| 4,949,189 | 8/1990 | Ohmori | 358/474 |
| 5,063,599 | 11/1991 | Concannon et al. | 382/137 |
| 5,091,961 | 2/1992 | Baus, Jr. | 382/139 |
| 5,134,663 | 7/1992 | Kozlowski | 382/139 |
| 5,206,915 | 4/1993 | Kern et al. | 382/305 |

Primary Examiner—Leo Boudreau
Assistant Examiner—Phuoc Tran
Attorney, Agent, or Firm—Wigman, Cohen, Leitner & Myers, P.C.

[57] ABSTRACT

A method of and apparatus for recapturing data from scanning devices and storing the captured data in digital form using a method that allows for easy, fast and reliable access for viewing, printing, transmitting, et cetera. More specifically, the method of the present invention allows institutions such as banks to "touch" data that has been captured using high speed reader/sorter devices. The invention interacts with such devices to store scanned digital images to storage devices using a hierarchical storage management module in order to migrate less accessed images to more cost effective storage media, such as optical disk and/or tape. Users access copies of the scanned items using an application that queries a database that holds pointers to the actual location of the physical digital image. The location of the scanned image is transparent to the end-user. The user selects the image to display based on a set of logical indexes that were built for each corresponding image at the time the image was read and scanned. Indexes include such information as date, account number, check number and amount. The user then has the option to view, print, or fax the images that were retrieved. In the case of banks, those images can be sent to the customer instead of the actual checks for a fraction of the cost in postage.

12 Claims, 7 Drawing Sheets

METHOD OF AND APPARATUS FOR DOCUMENT DATA RECAPTURE

CROSS REFERENCE TO RELATED APPLICATION

This application is a continuation-in-part of U.S. application Ser. No. 08/237,757, filed May 4, 1994, which is a continuation-in-part of U.S. application Ser. No. 08/006,543 filed Jan. 21, 1993, now abandoned.

FIELD OF THE INVENTION

The present invention relates to a method of and an apparatus for recapturing the data from a document, and more particularly, to a method of and apparatus for recording a video image of a document for later recapture or retrieval and processing, and especially in connection with the processing of documents such as bank checks, bank deposits, and the like.

BACKGROUND OF THE INVENTION

There already exists in the art an apparatus and method used in connection with processing bank checks called MICR numbers (Magnetic Ink Character Recognition numbers). A microreader is used with an MICR number that appears at the bottom of a bank check, bank draft, or bank deposit slip in order to establish an individual bank, account number, check number, and an amount of the check or deposit slip. As part of the process of clearing the checks and the deposit slips in the bank, a machine operator in the bank types on the lower right-hand corner of the check or deposit slip the amount of the check or deposit slip in MICR numbers prior to subsequent processing. At processing time, the items are fed into a high speed reader/sorter device that reads the MICR and sorts the documents based on information read from the MICR for each individual document.

In addition to the document being read and sorted, there is often a microfilming process that produces copies of each document. Other known machines use a pair of scanners for scanning the fronts and backs of checks to record data thereon. Another known prior art apparatus and process is available from the Eastman Kodak Company of Rochester, N.Y., and is known as a Kodak Imagelink Microimager 70. That system uses mirrors to transfer the fronts and backs of bank checks to microfilm. The Kodak Imagelink Microimager 70 includes a check "locator" feature, but does not provide full check retrieval as does the present invention. Prior art machines and processes providing imaging to magnetic media retrieval capabilities are relatively expensive and are thus considered impractical and cost-prohibitive for medium and small size banks.

A significant disadvantage of the known bank check microfilm systems is the absence of a way to centrally index and recover information from the microfilm since the bank checks arrive in the system randomly and are thus processed onto the microfilm in the random order of arrival. Also, with a random order of arrival in the microfilm system, there is no practical way to process bank statements with images of checks or the checks themselves because the microfilm is of no assistance in this regard.

The present invention solves many of the problems that exist with microfilm-based systems by scanning, indexing and storing the information digitally and by using a relational model to store the information. The banking institution, using the system of the present invention, can easily access information from a work station via a set of database queries. For instance, a user could query all checks drawn on an account over the past year.

Another known prior art apparatus does provide document capture into digital form; however, it requires expensive mainframe computers and reader/sorters to implement. Furthermore, since many of these solutions often use proprietary technology, such systems cannot be upgraded and therefore quickly become obsolete. For most banks, for example, with assets below $150 million, that type of solution becomes cost prohibitive.

In contrast, the present invention uses networked personal computers configured to exploit standard and industry accepted client/server architectures. Such systems are easily upgraded to incorporate future software and hardware technological advancements.

SUMMARY OF THE INVENTION

The present invention overcomes the disadvantages of the prior art systems and processes by the use of an architecture which allows for an open and extensible system that provides interoperability with several different software and hardware components. For instance, a hardware abstraction layer is utilized that isolates most parts of the system from each other. That type of architecture allows different types of hardware and software to be used without impacting other parts of the system.

Using the system of the present invention, a document is fed into a reader/sorter where it passes through several devices which include a microreader followed by from and back image cameras. When the document has passed through the transport, a first computer (the host controller PC) receives the MICR data and a second computer (the image capture PC) receives the from and back images of the same document. The host controller PC then performs three important tasks. First, it communicates to the sorter/reader which pocket into which to insert the document. Second, it communicates with the image capture PC to verify the quality of the image. Third, it communicates with the image capture PC the data to be coupled with the front and back images of the document. That data usually consists of the MICR and statistical data.

At that point, the image capture PC has received the MICR and image information for a document processed through the transport. The image capture PC then stores that information to a high speed magnetic buffer. Since that cycle is capable of running at speeds ranging from 350 to 700 documents per minute, the transport PC, host controller and image capture PC are tightly coupled in order to maintain those high rates of speed.

Once the image capture PC is at idle, it compresses the captured images into CCITT Group 4 format and transfers the information from each document across a network connection to an image server. Once the image server has received the information, the information is extracted and stored in a high speed SQL relational database along with all the indexing and statistical information. At that point, the information has passed through the image server's hardware abstraction layer and is ready to be accessed by users and other parts of the system.

The users access the information via a CUA (Common User Access) compliant application. The users have several options available to them. Each user is provided with great flexibility in querying document information based on captured document information, such as MICR data and/or date.

The information includes remaining MICR data, date, front/ back images, et cetera. Users can also print or fax one or more selected images. Users can also view and transport.

The users can also magnify and/or enhance the image being viewed so as to better interpret a part of the document. Finally, the users can access online help to assist in the usage of the functions as well as customized bank policies. Using the system of the present invention, the above described functions can be accessed from either a local or remote network connection. The physical location of the retrieved image is transparent to the application and can vary from high speed magnetic disk to inexpensive helical tape.

The invention also utilizes another module that resides on the network and monitors the capacity of the image server's stored information. Its main responsibility is to allow the migration of older and less accessed images that reside on the image server onto more cost effective media for long term storage. Such storage may be a combination of magnetic, optical and/or tape media. The purpose of the migration is to keep the current and more often accessed images on the image server's faster fault tolerant magnetic disk array for quick access by users and other applications.

Another module of the present invention that also resides on the network is responsible for printing customer statements based on information that resides on the image server. That module prints out a statement that contains a transaction listing and balance information followed by copies of each image processed during that statement cycle. The number of images that are printed on each page may be specified by the institution which will attempt to maximize the number in order to minimize the cost of postage. For instance, to print 16 images at four images per page requires four pages, whereas 16 images at 16 images per page would require only one page. The institution can also provide input as to the design of the statement layout. Due to the volume of statements to print, a dynamic load monitoring algorithm is used to balance the load placed on multiple printer configurations.

Another feature of the present invention is the ability to access the system remotely in order to access documents stored at a remote location. That feature is of particular interest to institutions for which documents are processed via a third party. That feature uses standard network access protocols using TCP/IP, IPX and/or NETBIOS and high speed modems.

BRIEF DESCRIPTION OF THE DRAWINGS

The drawing figures are block diagrams illustrating the system of the present invention.

DETAILED DESCRIPTION OF THE INVENTION

Figure 1:
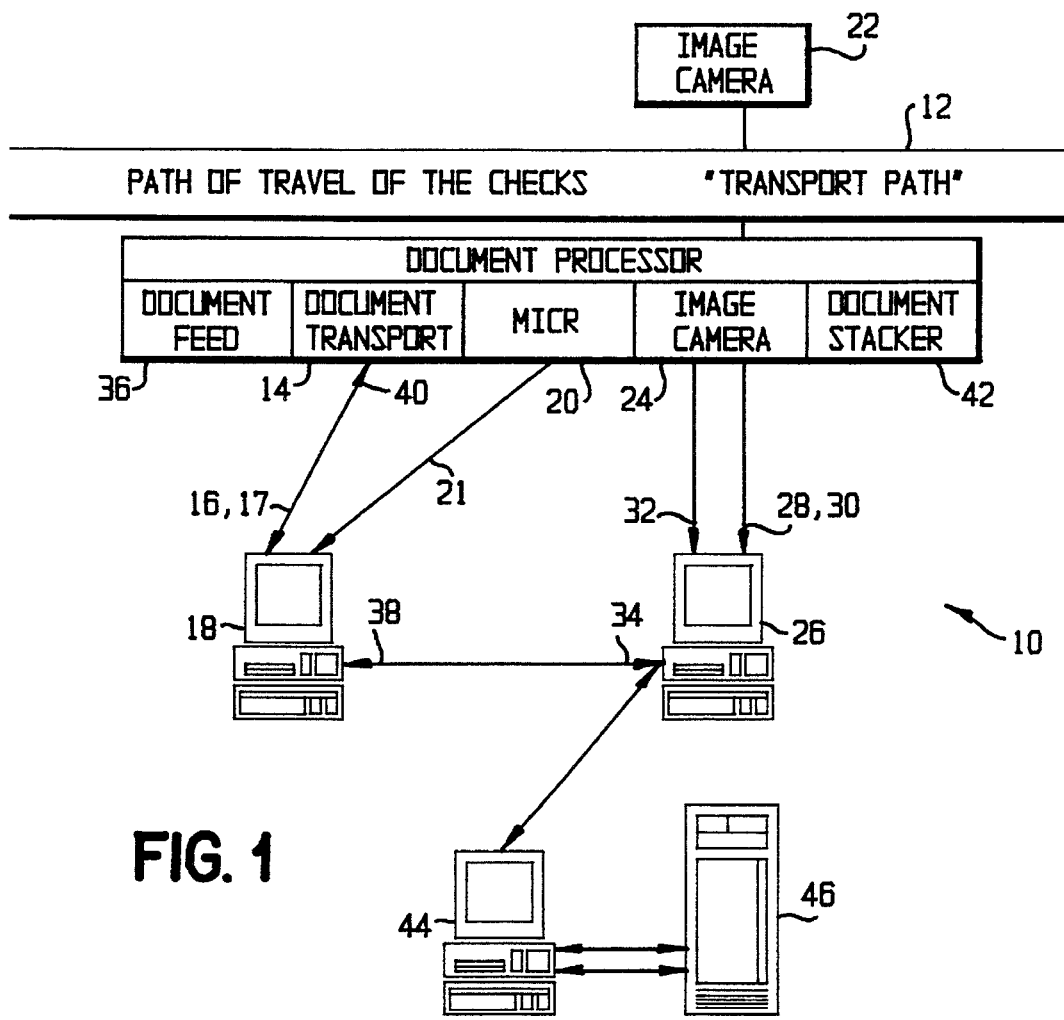
FIG. 1 is a schematic block diagram illustrating the system of the present invention.

Referring now to FIG. 1 of the drawings, there is shown in block diagram form an embodiment of the apparatus and method of the system of the invention which is designated generally by reference numeral 10. This embodiment is directed to the processing of conventional bank checks and deposit slips which typically have magnetic ink characters or MICR numbers (Magnetic Ink Character Recognition numbers) along the lower front surface thereof. In system 10, the bank checks are individually transported face up and end to end at speeds of 350 or 700 per minute and even considerably faster speeds along known transport path means 12 by a document processor 13 incorporating a document feed apparatus 36 and a document transport microreader 14.

When processing checks, cash tickets and deposit slips, the document transport 14 or document feed apparatus 36 assigns a unique sequential document number to each check and deposit slip, reports (16) information as to whether or not the document processor 13 is on or off, and also reports (17) information as to how fast the document processor 13 is running to the image sample computer 18 (PC 18), which is equipped with EDSL (Extended Data Sorting Language) software. EDSL is available, for example, from BTI Systems, Inc., of Oklahoma City, Okla., as is the transport path device 12 and the document processor 13. The PC 18 is also known as the host controller 18.

Typically, the checks and/or deposit slips are next transported past an MICR number microreader 20 for reading the magnetic ink characters on the bank checks and deposit slips and also feeding (21) MICR number information to the host controller 18. The checks are then transported past the image capturing devices or cameras 22, 24, which are positioned along the document transport path 12, and which are typically positioned in the path of travel with one slightly before the other, to capture video images of the fronts and backs of each bank check or document being processed. Preferably, the image capturing devices 22, 24, comprise two video cameras with digitized output that typically take pictures in slices of approximately one-half of an inch at a time.

The digital outputs of the front and rear image capturing devices 22, 24 are transmitted to two image capture boards or PICI (PC capture interface) boards located in the image capture computer 26 (the PC 26). One form of image capture board that is currently available is capable of placing "captured" data on 8086/8088 processor family media, which family media comprises magnetic discs and laser optical discs. Laser optical discs are used in the preferred embodiment of the present invention.

The image capture computer 26 may be an IBM AT class 486 personal computer, for example, and the computer 26 is also equipped with compression board software manufactured by, for example, BTI Systems, Inc. The host controller 18 is also equipped with a printed circuit board which allows it to interface with the document processor 13. One available printed circuit board to perform that interface function is the PC OEMI circuit board, also manufactured by BTI Systems, Inc.

The image capture boards in the image capture PC 26 receive (34) the unique sequential document number assigned by the document transport 14 along with the digitized images of the fronts (30) and the digitized images of the backs (32) of the checks or other documents being processed. In the image capture PC 26, the transmitted MICR number (21, 34) is added to the compressed image of each check with each check's associated unique sequential document number by an ALCRON compression board, available from Alacron, of Nashua, N.H., which combines the images of the fronts and backs of the checks from the image capture boards with the MICR numbers and the unique sequential document numbers and stores them on the magnetic disc of the image capture PC 26. The combined images are transmitted from the image capture PC 26 to an optical disc autochanger or "jukebox" 46 through the computer optical server 44.

As noted, the MICR number which has been previously read by the MICR number microreader 20 and stored in the host controller 18 is transferred (34) from the host controller 18 by interaction of the image capture PC 26 and the host controller 18.

Should the document feed 36 and document processor 13 begin feeding checks past the image cameras 22, 24, either too fast or too slow for the image capture PC 26 to be able to properly function and record the compressed images of each check along with each check's unique sequential document number and MICR number, the image capture computer PC 26, which is equipped with the PC OEMI interfacing software, also performs an operating speed control function by feeding a speed control signal (38) back to the host controller 18 using the EDSL and image sample software. The host controller 18 in turn feeds the speed control signal (40) back to the document transport 14, where the appropriate increase or decrease in the speed of the document processor 13, and thus, the travel of the checks along the transport path 12, is accomplished.

After the checks have passed the image cameras 22, 24, they proceed to a document stacker 42. All necessary information to handle a customer's bank statements and bank accounts in the practice of the present invention is now stored in the image capture PC 26. In prior art systems, if the actual checks themselves are needed or desired in a particular bank customer's case, the checks would be run through an available MICR number sorter for a few sorting cycles. However, in the system of the present invention, no additional equipment is required because one simply disengages the image cameras 22, 24, and runs the checks gathered in the document stacker 42 through the document processor 13 again—possibly several times—in order to sort the checks using MICR numbers. The document processor 13 may be a Model 90690 Document Processor manufactured by BTI Systems, Inc. The document sorter could, for example, be set to sort by bank account number. Alternatively, the checks could be sorted electronically by MICR number, bank account number, etc.

The output of bank statements for bank customers by the present system is such that an individual bank may utilize check imaging statements that include approximately 10 to 20 check images per page to avoid the necessity of returning the actual cancelled checks to the bank's customers. By the use of such "truncated check imaging statements", as they are referred to in the art, the necessity of a relatively high level of manual labor in filing checks and deposit slips is eliminated and the postage expense for a small bank can be cut dramatically. One established vendor estimates that image processing and "image statements" of checks can reduce a bank's postage expense 40% to 60% while simultaneously reducing labor costs and improving productivity and customer service.

Additionally, the checks processed with the present system all automatically come out in check number order on the imaged bank statements, thereby providing additional acceptability to customers and satisfying a long-felt need. Check imaging statements are presently available using relatively expensive machines and systems, but the cost of providing those advantages to bank customers for small and medium-sized banks is so prohibitive that small and medium-sized banks do not, as a rule, offer such a service to banking customers.

The processed image information stored on the magnetic disc in the image capture PC 26 is formatted and written to the optical autochanger or "jukebox" 46 through the computer optical server 44 for long term storage and retrieval purposes by, for example, bank employees seeking to directly serve the special request needs of a bank's customers. The optical autochanger 46 may preferably be a WORM or other optical storage device.

In practice, bank employees may perform a number of special request customer-related and operations-related functions by accessing the autochanger 46 through the optical server 44.

Figure 2:
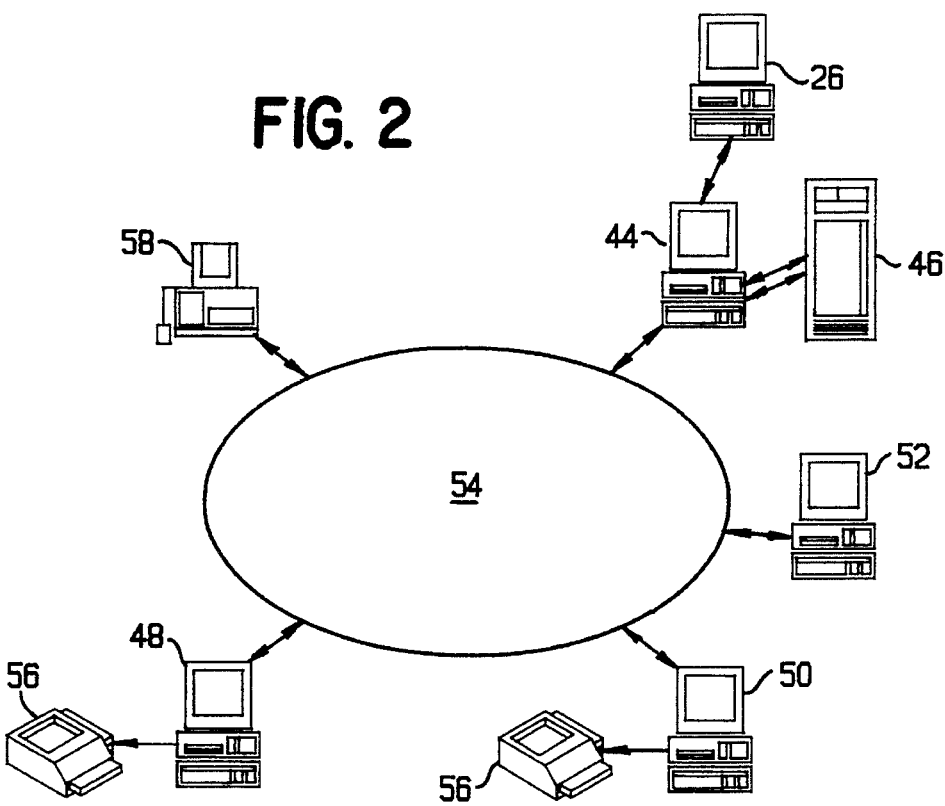
FIG. 2 is a schematic block diagram of a computer network system of a bank that employs the system of the present invention.

Referring now to FIG. 2 of the drawings, there is shown in block diagram form an embodiment of the system of the invention in which individual computer research stations 48, 50, 52, representing the work stations of various bank employees, are provided access to the information stored in the optical autochanger 46 through a computer network 54, such as a Novell brand computer network. If a particular bank customer calls in and asks for a print-out of only certain checks or only a portion of a certain bank statement that, for example, the customer has misplaced, the operator of the research station 48, for example, can perform that task from the operator's work station. Using the laser printer 56, the operator can print and mail the customer the print-out without ever leaving the work station and without having to conduct hours of research or requiring the assistance of another employee for hours of research. Most small and medium-sized banks presently perform this type of special request search by an extremely time consuming "by hand" search of the microfilm records in the name of, and for the sake of, "customer service ". On the other hand, some banks charge the customer for such customized services, but the manual labor and those costs are relatively high, thereby leading to customer dissatisfaction.

Utilizing the present invention, other bank customers having particularized needs and who want customized services, such as a copy of that day's checks faxed to them at the close of each day, or each week, or each month, can be provided with the information they seek virtually on-line by facsimile transmission 58 sourced in the optical autochanger 46 through the optical server 44 and through the computer network 54.

Figure 3:
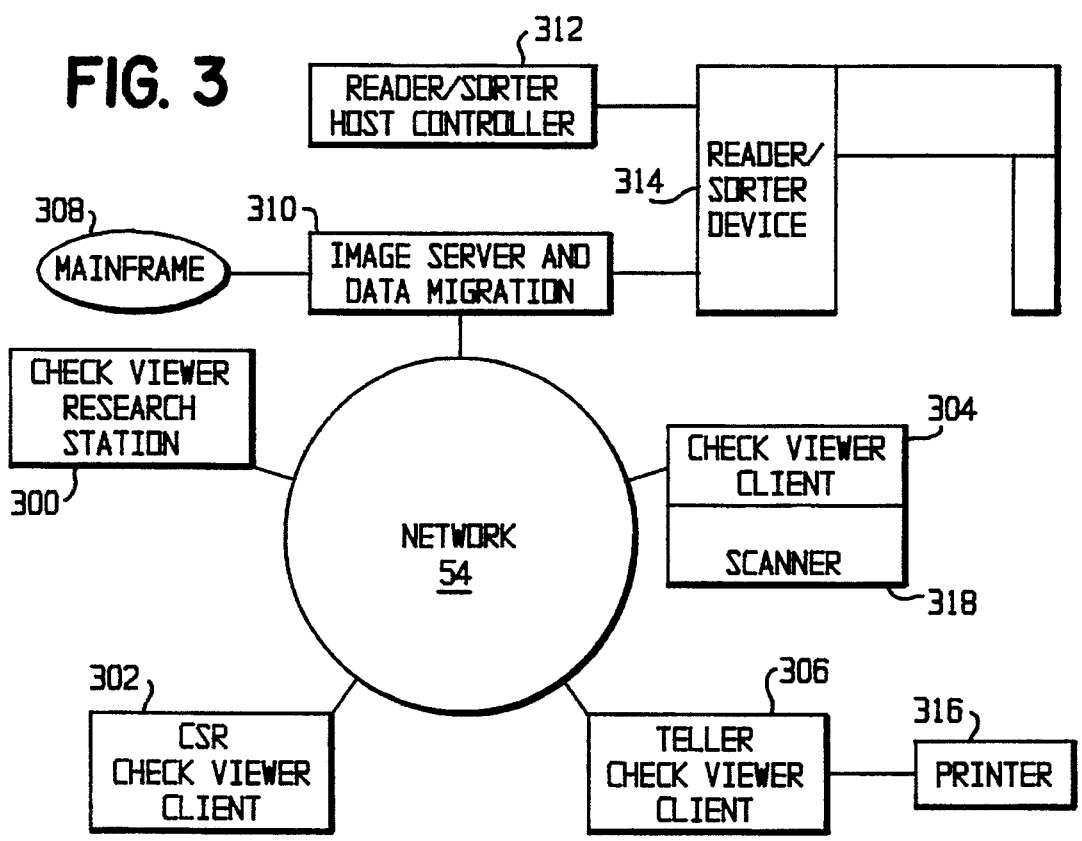
FIG. 3 is a drawing of a schematic block diagram of an alternative and preferred embodiment of the present invention.
Figure 9:
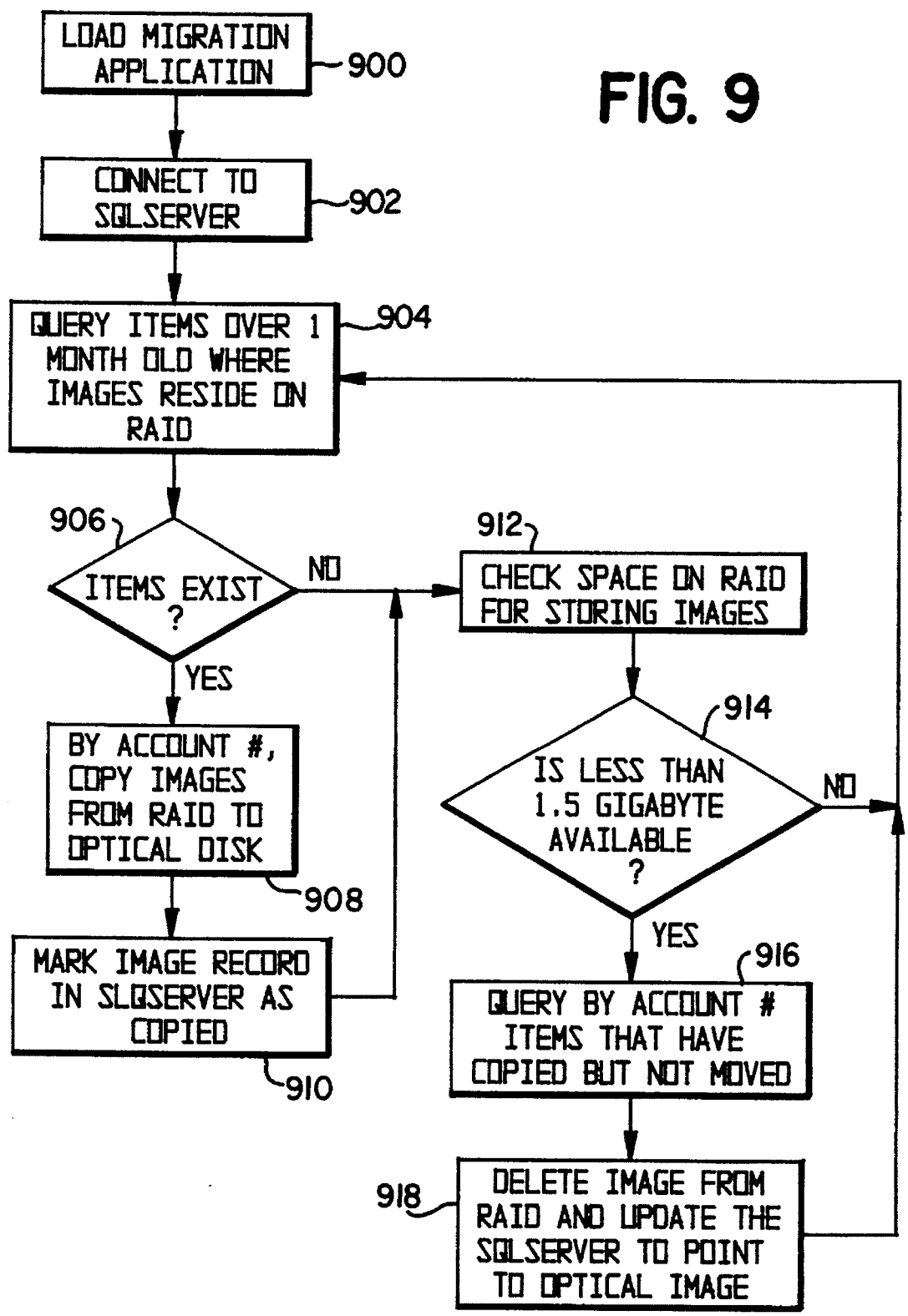
FIG. 9 is a diagram of a flow chart of the data migration module used in connection with the preferred embodiment of the invention.

FIG. 3 is a schematic block diagram of an alternative and preferred embodiment of the present invention. In the preferred alternate embodiment of the present invention, a network 54 is also utilized. Connected to that network 54 is a plurality of check viewer stations 300–306 used to gain access to and/or to communicate with any of the other devices connected to the network 54. For example, the check viewer research station 300 can be used to view checks as previously described in connection with the first embodiment of the system of the present invention. The image server 310, in addition to performing as the server connection between the reader/sorter 314 and the network 54, retains primary responsibility for the data migration module. The function of the data migration module is to interrogate the system's data storage resources and migrate aging and less-accessed information onto other, usually less expensive, media. A diagram of the flow chart of the data migration module is shown in FIG. 9.

Also connected to the network 54 is a customer service representative (CSR) station 302 and a teller check viewer station 306. Those work stations 302 and 306 allow the user to access item information contained in the system of the present invention by utilizing the network 54. Such item information includes the MICR and the images associated with each MICR. Any of the check viewer work stations 300–306 may be connected to a printer, such as printer 316 connected to the teller check viewer work station 306, for the purpose of printing out information from the system of the present invention.

The fourth check viewer work station 304 shown in FIG. 3 functions in the same manner as the check viewer work stations 302–306, and may optionally include a scanner 318 for the purpose of scanning data into the system of the present invention. As previously described in connection with the work stations 48, 50 and 52, each of the work stations 300–306 may be an IBM AT-class personal computer having a 486 family microprocessor and the appropriate amount of volatile and nonvolatile memory.

Also connected to the network 54 is an image server PC 310 which may also function as a check viewing work station, in addition to handling the data migration functions. The image server work station 310 may optionally be connected to a mainframe computer 308 in order to connect the network 54 to, for example, an existing mainframe computer of a bank or other financial institution.

A reader/sorter device 314 is provided for reading the checks and sorting them as described in connection with the first embodiment of the system of the present invention. The reader/sorter device 314 is controlled by a reader/sorter host controller 312. The output from the reader/sorter device 314 is provided to the image server 310 for storage and manipulation, and for other purposes as described in the application, as will be known to those of ordinary skill in the art.

Figure 4:
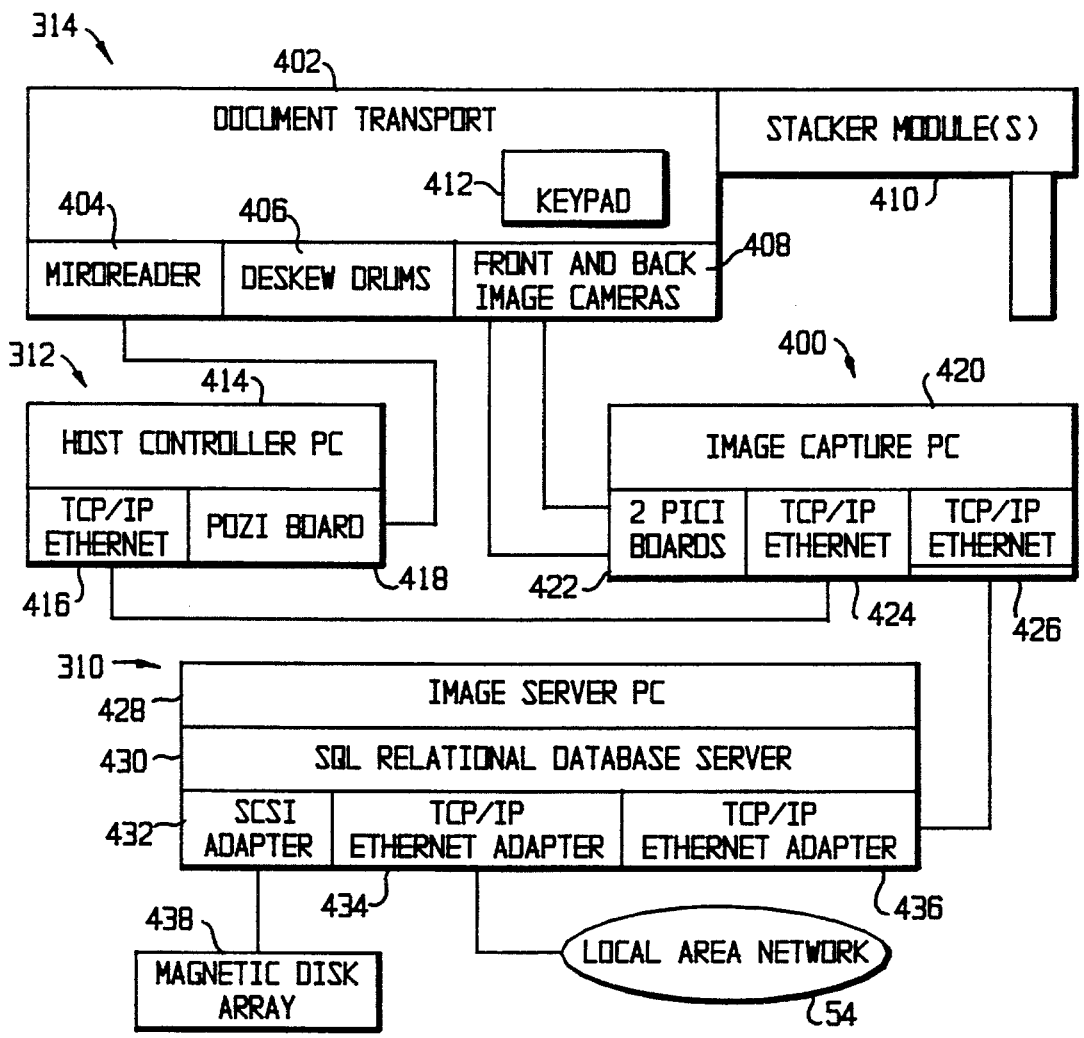
FIG. 4 is a drawing of a schematic diagram of a preferred hardware embodiment of the system of the present invention.

FIG. 4 is a schematic diagram of a preferred hardware embodiment of the document data recapture system of the present invention. In order to use the system, a document transport 402, which may be a BTI model 90690, 91690 or 94690 document transport, available from BTI Systems, Inc. of Oklahoma City, Okla. 73174, is started and performs internal tests for hardware failures. If all tests pass, the document transport 402 enters an OFFLINE mode. Associated with and forming a part of the document transport system are a microreader 404, deskewing drums 406, front and back image cameras 408, and one or more stacker modules 410.

Next, an image capture PC 420 is started and establishes communication with the image modules associated with the front and back image cameras 408 and transport system 402, utilizing two PICI boards 422. The image capture PC 420 utilizes such PICI boards 422 in order to transmit front and back uncompressed images of each of the checks being viewed by the cameras to the image capture PC 420.

The host controller PC 414 is then started and the host controller software is loaded. The host controller software attempts to establish a connection with the document transport system 402. Communication takes place using a POZI adapter 418, which is also available from BTI Systems, Inc., and which resides in the host controller 312. The POZI board 418 is attached to the bus of the host controller PC 414 and communicates with the document transport system 402, and specifically with the microreader module 404 of the document transport system 402. The POZI board is accessed using known RS-422 drivers and receivers. Such access must be fast, however, because once the MICR data is sent to the controller 312, there is only approximately 50 milliseconds time within which the controller 312 must respond back to the document transport system 402 indicating to which pocket a subject document is to be inserted.

When the host controller 312 establishes an ONLINE connection with the document transport 402, it then establishes a connection with the image capture PC 420 by means of the TCP/IP Ethernet connecters 416 and 424. Once the operator changes the mode of the document transport system 402 to ONLINE, using the keypad 412 of the document transport system 402, the host controller 312 can then communicate directly with the document transport system 402 using predefined commands. The connection of the host controller 312 by means of the POZI board 418 to the microcode reader 404 of the document transport system 402, allows the host controller 312 to receive MICR information as the documents are passed through the microcode reader 404 of the document transport system 402. The host controller 312 then examines the data and sends back to the document transport system 402 information such as into which pocket of the stacker module 410 the document should be sorted.

Additionally, the data received from the microcode reader 404, the selected pocket number of the stacker module 410 and other data is also broadcast by means of the TCP/IP Ethernet board 416 connection to the like Ethernet board 424 associated with the image capture PC 420. Such connections consist of a 10BaseT Ethernet connection using TCP/IP protocol support for messaging services. That connection allows the host controller 312 to send microreader information to the image capture PC 420 where the data will be associated with its corresponding uncompressed front and back image data.

Further, the image capture PC 420 establishes a connection with the image server 310 by means of a second TCP/IP Ethernet board 426, which is connected to a like Ethernet adapter 436 which forms part of the image server 310. Such connection allows the image capture PC 420 to send the MICR data, front and back images, and other detailed data, to the image server 310 for longer term storage.

As shown in FIG. 4, the image server 310 includes as components an image server PC 428, an SQL relational database server 430, an SCSI adapter 432, a second TCP/IP Ethernet adapter 434 which connects the image server PC 428 to the local area network 54, and the previously discussed first Ethernet adapter 436. Also, a magnetic disk array 438 is connected by means of the SCSI adapter 432 to the image server 310 for long term storage purposes.

In order to process documents, the system of the present invention is turned on and all of the connections described above are established. Then, one or more documents are fed into the document transport system 402 and the feed button located on the document transport system 402 is depressed. If the host controller 312 is ready, the document transport 402 will begin feeding the documents. Each document will first be straightened using a first one of the deskewing drums 406 located on the side of the document transport system 402. Then, each document passes through the microreader 404 which reads the MICR information and sends it to the host controller 312 by means of the POZI board 418, as previously discussed. The host controller PC 414 of the host controller 312 receives the MICR data by means of the POZI board 418, determines which pocket of the stacker module 410 the document is to be inserted into, and then sends that information back to the information transport system 314, again by means of the POZI board 418.

The host controller PC 414 also sends the MICR and related detailed information to the image capture system 400. That data is communicated by means of the Ethernet adapters 416 and 424 associated respectively with the host controller PC 414 and the image capture PC 420. The MICR data and other detailed information received at the image capture PC 420 is queued for later use.

After the read document exits the microreader 404, it is passed through a second deskewing drum 406, where it is straightened out before being imaged. The front and back image cameras 408 then take digital pictures of the document and transmit those images to the image capture PC 420 by means of the two PICI boards 422, as previously discussed. The front and back images transmitted to the image capture PC 420 are also queued for later processing.

Once the image capture PC 420 is not busy receiving images, the queued MICR data and its corresponding front and back image data are merged together and stored in a magnetic disk buffer or other type of storage medium. During periods where the image capture PC 420 is idle, those images are transmitted by means of the second Ethernet adapter card 426 to a like Ethernet adapter card 436 which forms part of the image server 310. Those images are stored by the image server 310 for more permanent storage on a large capacity magnetic disk array 438, which is controlled by means of the SCSI adapter 432 which also forms part of the image server 310 and which is connected to the bus of the image server PC 428.

When the image capture PC 420 transmits the MICR and image information to the image server PC 428, the transmitted item is removed from the magnetic storage buffer of the image capture PC 420. The image server 310 then extracts the information received from the image capture PC 420, converts the front and back images to a multi-page TIFF Version 6 image file and stores it on the magnetic disk array 438.

The image server 310 then takes the MICR and other detailed data, and indexes it in an SQL database using the SQL relational database server 430. It is stored in the SQL database, together with the name of the image file stored in the magnetic disk array 438. The name of the image file of the corresponding front and back images of the MICR number serves as a pointer to the image file when accessed.

The above-described sequence is repeated for every document that passes through the document transport system 402. The detailed information for each document that is inserted into the SQL database contained on the database server 430 includes such information as the pocket ID, length, MICR fields, date, sequence number, et cetera. In addition, the pocket ID number is used to identify which documents were rejected and are thus in need of repair. At that point, the document has passed through the hardware abstraction layer. Various application software can be used to access document information by means of the local area network 54.

Figure 5:
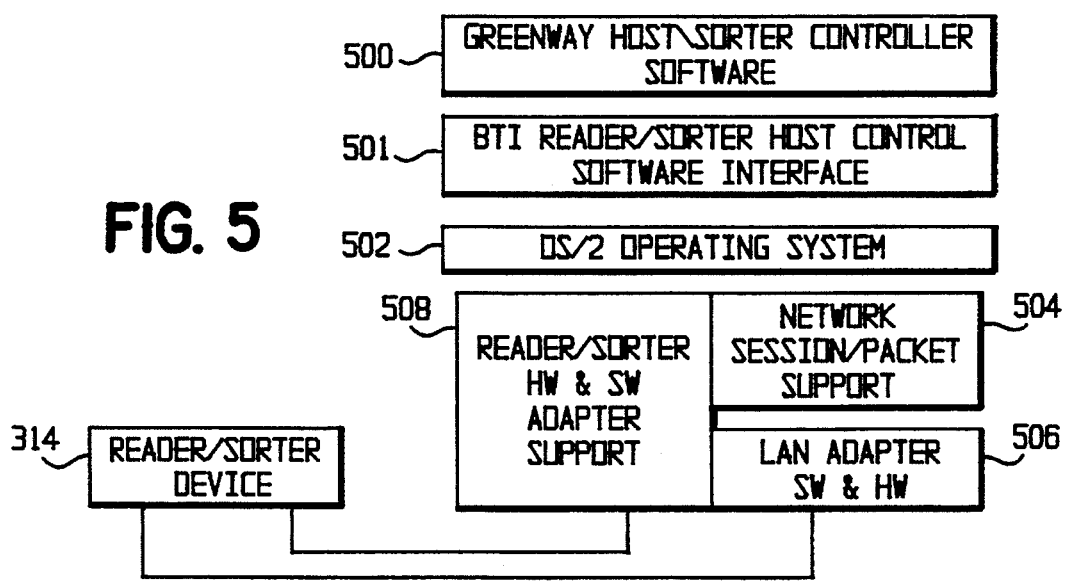
FIG. 5 is a block diagram of the various software components which are used in connection with the operation of the reader/sorter host controller component of the system of the present invention.

Referring now to FIG. 5, there is shown in block diagram form the various software and hardware components which are used in connection with the operation of the reader/sorter host controller 312. The data processing controller/host module 312 which is schematically shown in FIG. 5 allows users to control the various features of a specific document processor use, such as the reader/sorter device 314.

Figure 10:
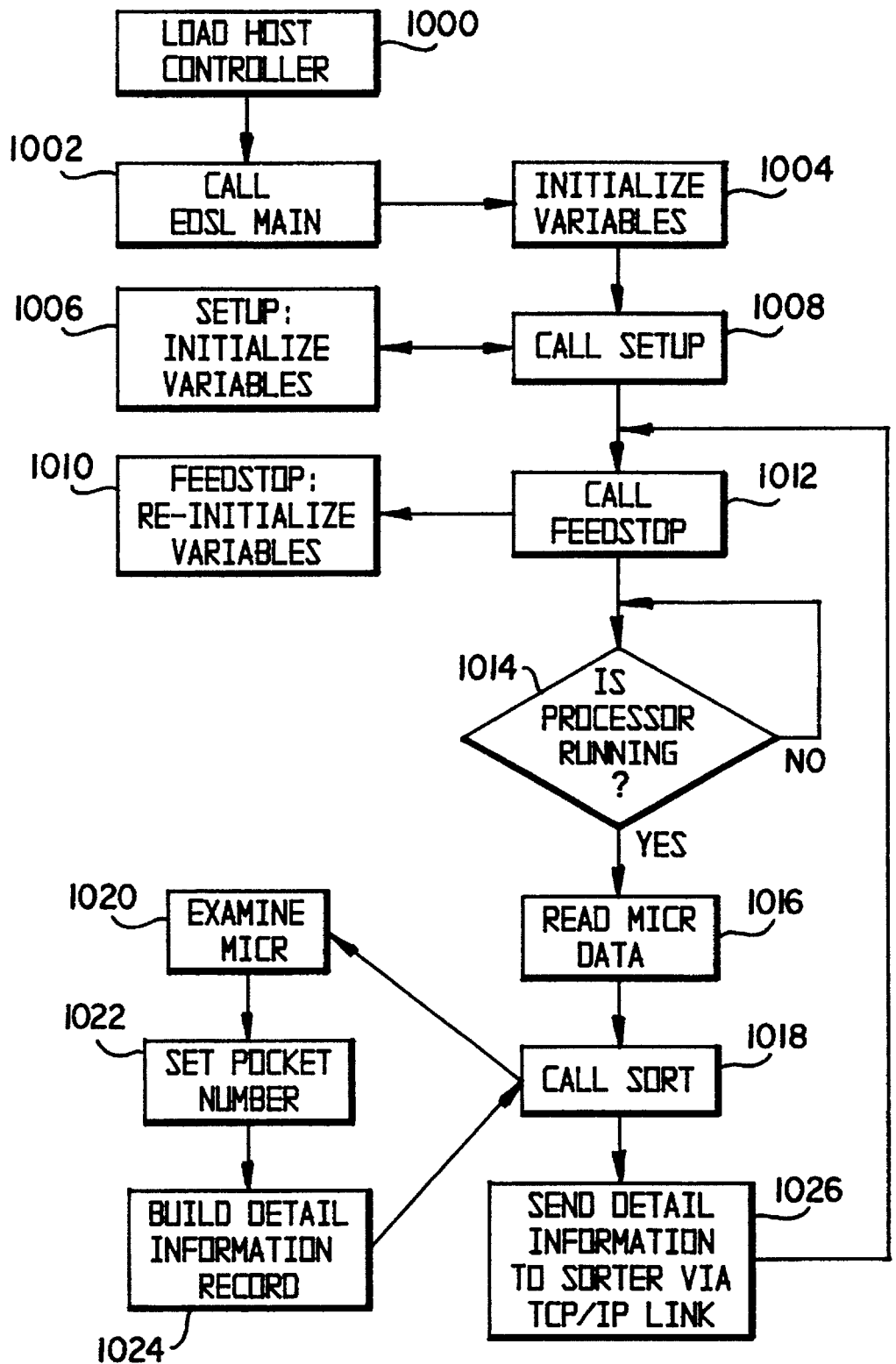
FIG. 10 is a diagram of a flow chart of the host controller module used in connection with the preferred embodiment of the present invention.

The DP controller/host module 312 is formed from a variety of components, such as the reader/sorter host controller software 500, which is shown in block diagram flow chart form in FIG. 10. The reader/sorter host controller software 500 may preferably be GWCHOST software, available from Greenway Corporation of Carrollton, Ga. The DP controller/host module 312 also includes the BTI reader/sorter host control software interface 501, which may preferably be EDSL (Extended Data Sorter Language), available from BTI Systems, Inc. The operating system 502 of the controller or host module, may preferably be the DOS and OS/2 operating systems, available from IBM Corporation. Also included as part of the controller host module 312 is the network session/packet support software 504, which preferably be FTP TCP/IP DOS/OS/2 software, available from FTP Software, Inc., of North Andover, Mass. The LAN adaptor software and hardware 506, may preferably be an SMC Elite 16 Ethernet adapter, available from Standard Microsystems Corporation, of Hauppauge, N.Y. The reader/sorter hardware and software adapter support component 508, which is a POZI adaptor, available from BTI Systems, Inc., also forms a part of the DP controller/host module 312. The reader/sorter device 314 is connected to both the reader/sorter adapter support component 508 and to the LAN adapter module 506.

In operation, the DP controller/host module 312 is used to define the various sort methods desired, as well as to insert item separators from the merge/feeder function. The DP controller/host module 312 is used to select which devices to use, such as the imaging cameras, the MICR reader, an inkjet printer, et cetera. Console errors are displayed in a user-friendly format, which also provides suggestions for the recovery of errors.

The DP controller/host module 312 also sends the MICR data and other information to the image server 310, and, as previously described, gathers information to be sent to the image server 310 and identifies individual check runs and check batches. The DP controller/host module 312 has the ability to insert separators after a certain amount of checks are written into a pocket and to identify a batch header and other special items.

Finally, the DP controller/host module 312 is used to reset the sequence number at the beginning of a new check run as well as to parse MICR data in order to identify the various fields, such as Aux, Onus, the FRB number, the amount of the check, et cetera.

The operation of the host controller module software is shown in diagrammatic flow chart form in FIG. 10. The host controller 312 is first loaded at step 1000 and then the EDSL Extended Sorter Language software used to control the sorter/reader device 314 is called at step 1002. The variables are initialized at step 1004 and then the Setup program is called at step 1008. The Setup module then initializes additional variables at step 1006. The Feedstop module is then called at step 1012, which then reinitializes the variables at step 1010. A determination is then made at step 1014 of whether the reader/sorter device 314 is running. If it is not, the program waits until it determines an affirmative response at step 1014.

Once an affirmative response is detected at step 1014, the MICR data 1016 is read from the microreader 404 of the reader/sorter device 314 and then the EDSL Main program calls the Sort subroutine at step 1018. The Sort subroutine then examines the MICR code read at step 1020, sets the pocket number for that document at step 1022 and then builds the detail of the information record read at step 1024. The EDSL Main program then returns to step 1018 and sends the detailed information to the reader/sorter 314 by means of the TCP/IP Ethernet link formed by the Ethernet adapters 416 and 424. The host controller module then jumps to begin executing with step 1012 to again call the Feedstop subroutine and execute steps 1010–1026, as previously discussed, in order to read the next document.

Figure 6:
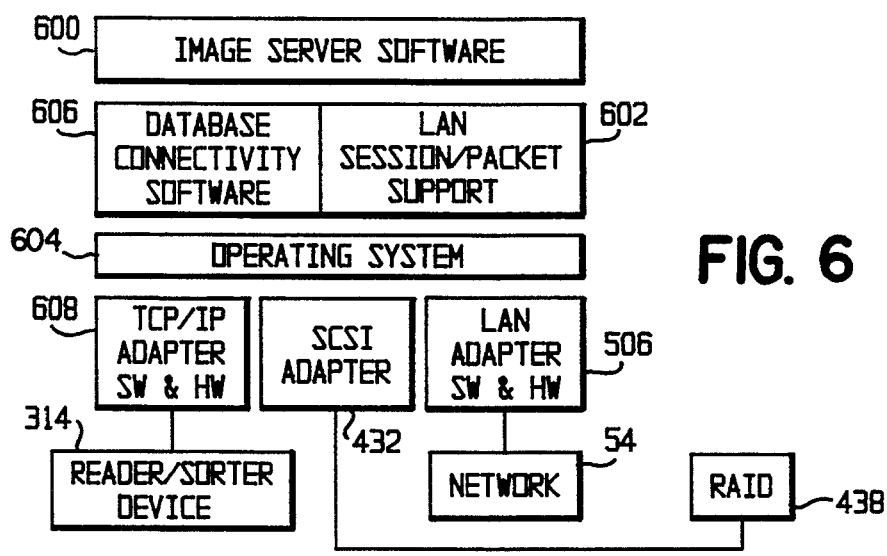
FIG. 6 is a block diagram of the image server module software used with the system of the present invention.
Figure 11:
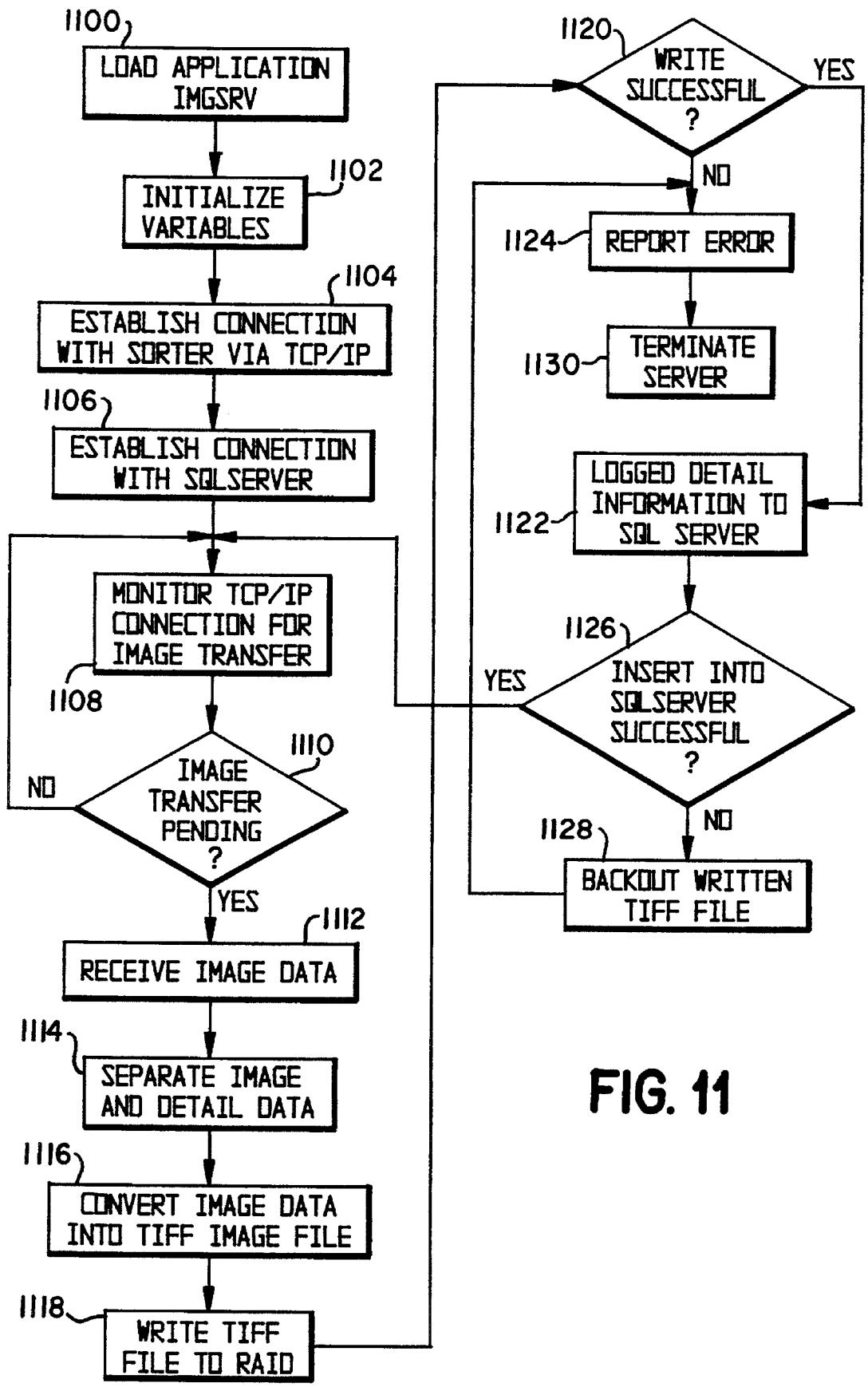
FIG. 11 is a diagram of a flow chart of the image server module used in connection with the preferred embodiment of the present invention.

FIG. 6 illustrates, in block diagram form, the hardware and software components used to operate the image server 310. FIG. 11 shows in diagrammatic flow chart form the image server software 600 used to operate the image server 310. The primary responsibility of the image server software 600 is to accept the MICR and image information from the reader/sorter device 314, convert it into a common format, and then store the converted information. Converting the information to a common format isolates the item/check viewing software from the reader/sorter 314 device installed at a particular installation.

As previously discussed, the MICR item information is then stored in an SQL client/server database 430. The images are stored in files that reside on a file system. Such a file system may reside on optical, helical or magnetic media.

Turning now to the specific components of the image server module, the first component is the image server software 600, which may preferably be IMGSRV, available from Greenway Corporation. ALAN session/packet support 602 and database connecter 606 are also provided. The database connectivity software 606 may preferably be the ODBC (Open Data Base Connectivity) and Database Library Software, available from Microsoft Corporation of Redmond, Washington. The LAN sessions/packet support software may preferably be Novell 4.0x for OS/2 Requester, available from Novell Corporation of Provo, Utah. In addition, the operating software system 604 necessary in order to operate the image server 310 is also contained in the image server module. That software is preferably the DOS and OS/2 operating system software, available from IBM Corporation of Armonk, N.Y. Finally, as previously discussed, the LAN adapter software and hardware 506 is used to connect the image server 310 to the network 54, and to the reader/sorter device 314. The LAN adapter software and hardware 506 may preferably be an Eagle EP3210ESIA Ethernet Adaptor, available from Eagle Technology of San Fernando, Calif.

The image server module shown in FIG. 6 utilizes TCP/IP adaptor software and hardware 608, which is used to connect the image server module to the reader/sorter device 314. The TCP/IP adaptor hardware and software support is provided by an SMC Elite 16 Ethernet adaptor, as previously described, while the TCP/IP packet/session support software used with that adaptor may preferably be TCP/IP OS2 Base software, available from IBM Corporation. In addition to being able to communicate with the reader/sorter 314 and the network 54, the image server module is also designed to be able to store data in a magnetic disk array, such as a RAID 438, which may preferably be obtained from Micropolis of Chatsworth, Calif. The SCSI Adaptor 432, which may be a model 1740 Adaptec SCSI adaptor available from Adaptec of Milpitas, Calif., is utilized to provide the communication link between the image server module and the RAID storage device 438.

The image server module performs various functions in connection with the data document recapture system of the present invention. First, it services insert requests from the reader/sorter device 314 and then inserts records into a database. The image server module communicates with different databases by means of SQL or ODBC protocol. In addition, the image server module functions to store check run data in an intermediate storage location for modification by the user. For example, rejected items and entries that raise an exception based upon image quality characteristics may be viewed and modified by a user for subsequent storage.

The image server module also services requests by clients for the retrieval of specific images, as previously discussed. In addition, the module maintains a database of current customer information. In that manner, it provides additional search capability and statement information functions. The image server module also provides database archival/backup support for database optimization and reorganization in order to improve database performance as well as to provide maintenance for the database. Finally, the image server module uploads completed and approved check information to the host computer system 308.

In operation, the image server module first loads the image server software IMGSRV at step 1100, initializes variables at step 1102 and then establishes a connection with the reader/sorter 314 by means of the TCP/IP adaptor 608, at step 1104. Next, a connection with the SQL server 430 is established at step 1106. The image server IMGSRV software then monitors the TCP/IP connection 608 for an image transfer at step 1108.

A determination is then made at step 1110 of whether an image transfer is pending. If a negative determination is made at step 1110, then the program returns to continue monitoring the TCP/IP connection at step 1108. If an affirmative determination is made at step 1110, then the program receives the image data at step 1112, separates the image and detail data at step 1114 and then converts the image data into a TIFF Image file at step 1116. Then, at step 1118, the TIFF file is written to the RAID magnetic disk array 438.

A determination is then made at step 1120 of whether the write operation to the RAID magnetic disk array 438 has been successful. If a negative determination is made at step 1120, then an error is reported to the user at step 1124 and the connection to the SQL server 430 is terminated at step 1130.

If an affirmative determination is made at step 1120, then the detailed information is logged to the SQL server 430 at step 1122 and a determination is then made of whether the data insert into the SQL server 430 has been successful at step 1126. If an affirmative determination is made at step 1126, then the program returns to again monitor the TCP/IP adaptor connection at step 1108 for an image transfer. If a negative determination is made at step 1126, then the written TIFF file is backed out at step 1128 and an error is reported at step 1124. The connection to the SQL server 430 is then terminated at step 1130.

Figure 7:
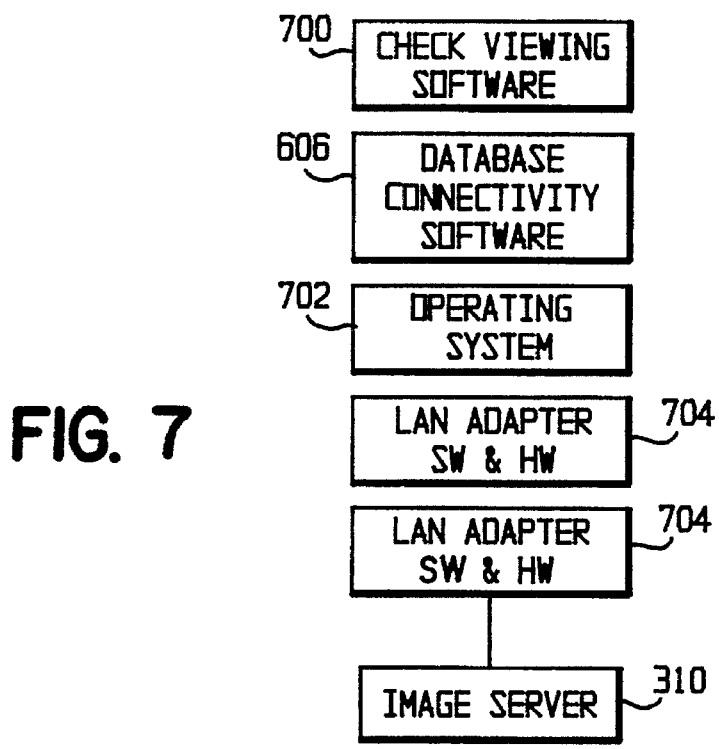
FIG. 7 is a block diagram of the item/check viewing module used in connection with the system of the present invention.

The item/check viewing module, which may operate, for example, on the work stations 300–306, is shown in block diagram form in FIG. 7. The function of the item/check viewing module in its item viewing application it to allow the users to access viewing information, which includes the MICR number and its associated images. In addition, various reports can be generated using this module. The information used to generate the reports, as well as the MICR number and its associated images, is accessed by means of the client/server database.

The item/check viewing module includes viewing software 700, which may preferably be ITEMS Software, available from Greenway Corporation, the database connectivity software 606, the operating system software 702 for the work station and the LAN adapter software/hardware 704. The operating system software 702 may preferably be Microsoft Windows 3.1, available from Microsoft Corporation. The LAN adaptor software/hardware 704 may preferably be an Eagle NE 2000 Ethernet Adaptor, available from Eagle Technology. Novell 4.0x software may be used for the network packet/session support software. As previously discussed, each of the work stations 300–306 is connected by means of the network 54 to the image server 310.

The check viewing software 700 also allows the work station to flip between the from and back images of a check or to show the from and back images simultaneously. It allows the user to magnify a part of the check and to fax or print one or more checks to a destination connected to the network 54 with an attached note or a cover letter. The most commonly used functions are controlled by speed keys and/or a tool bar.

The check viewing software 700 of the item/check viewing module provides the user with the ability to access Onus items via the account number, amount, the check number, the date sequence number, the check run, the check batch, et cetera, as well as the ability to access foreign items by means of the routing number, the amount, sequence number, the date, the check run, et cetera. The check viewing software 700 provides image window support, as well as the ability to support in a folder a set of images from different queries. That function allows the user to gather a group of checks for printing, faxing or totalling.

The item/check viewing module has the ability to communicate with the image database in a non-specific database format. For example, the database access would be SQL or ODBC protocol. The item/check viewing module further allows the user to print a check run report which contains pocket totals and end counts, to print an end-of-day report and the ability to repair document rejects. The repair of document rejects involves entering the defective MICR data, rotating a check, or rescanning it. In addition, using the check viewing Software 700, the user is able to look at previously corrected items, and to easily list and correct all rejected items.

Figure 8:
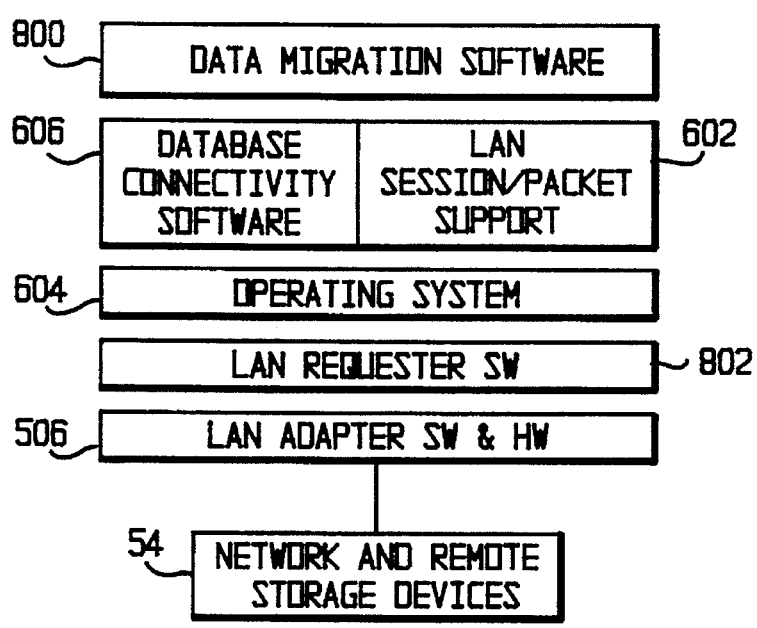
FIG. 8 is a block diagram of the data migration module which is used in connection with the system of the present invention.

The data migration module, a block diagram of which is shown in FIG. 8, may be installed on one or more of the work stations, such as work station 310 shown in FIG. 3. The primary responsibility of the data migration module is to interrogate the system resources and to migrate less-accessed information onto other, and usually less expensive, storage media. The data migration module is aware of the migration path and periodically monitors higher level resources and migrates data to the then next lower level resources during periods when activity on the network 54 is low and the higher level data resources begin to approach maximum capacity.

The data migration module includes data migration software 800, which is installed on the work station 310. The IMGSRV Software from Greenway Corporation includes a data migration component, a diagram of the flow chart of which is shown in FIG. 9. It also includes LAN session/packet support software 602 and database connectivity software 606.

The data migration module further includes operating system software 604 for performing the basic functions of the work station 310, as well as LAN requester software 802, which may preferably be Novell 4.0x for OS/2 Requester, available from Novell Corporation. A LAN adapter software/hardware 506 is also utilized. The TCP/IP OS/2 Base Software available from IBM Corporation is preferably used for TCP/IP packet/session support software. As previously described, the work station 310, or any other work station which includes the data migration module such that it performs data migration functions, is connected to the network 54 and from that to remote storage devices, such as the RAID 438.

Referring now to FIG. 9, the data migration application of the IMGSRV software is loaded at step 900 and then a connection to the SQL server 430 is established at step 902. Then, a query of items over one month old of which images reside on the RAID magnetic disk array 438 is made at step 904. If a negative determination is made that such items exist at step 906, then the data migration software goes to step 912.

If an affirmative determination is made at step 906 that such items exist, then the images are copied, by account number, from the RAID magnetic disk array 438 to an optical disk (not shown), at step 908. The image record in the SQL server 430 is then marked as copied at step 910 and then a check is made for available space on the RAID magnetic storage device 438, at step 912.

At step 914, a determination is made of whether there is less than 1.5 gigabytes of available space in the RAID magnetic storage device 438. If a negative determination is made at step 914, then the data migration application software jumps to step 904 and continues to process additional items over one month old. If an affirmative determination is made at step 914, then a query is made by account number for items that have been copied from the RAID 438 onto the optical disk but have not been moved, at step 916. Then, the images corresponding to the account numbers that have been copied but not moved are deleted from the RAID magnetic storage device 438 at step 918 and the database contained in the SQL server 430 is updated to point to the optical image stored on the optical disk.

Using the above-described procedure, the system of the present invention need preferably only archive items stored on the RAID magnetic storage device 438 once per month. Thus, each customer's checks, deposit slips and cash tickets and bank statement can all be transferred to an optical disk in such a manner that such records are stored on the optical disk with the checks sorted by number or other criteria and preferably in a location contiguous to the customer's monthly bank statement, cash tickets and deposit slips. An additional advantage over prior art systems is then achieved since the system of the present invention is able to electronically sort checks by MICR number or other criteria and then store them in the desired order.

Although certain presently preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

What we claim is:

1. A system for processing a plurality of individual documents, each having a front and a back with images thereon, comprising:
   a document transport system for transporting the individual documents along a transport path for reading MICR data on each document, and said document transport system further including at least one camera for producing images of the front and back of the individual documents;
   a first digital data processor connected to said document transport system for receiving said MICR data and a sequential document number for each document;
   a second digital data processor, said second digital data processor being connected to said first digital data processor so that said first digital data processor communicates said MICR data and sequential document number to said second digital data processor, said second digital data processor also being connected to said document transport system for receiving said images of said front and back of each individual document, and for merging said MICR data and sequential document number with said images to form merged images, said second digital data processor further communicating speed control data to said first digital data processor for use by said first digital data processor to control said document transport system to a desired speed; and
   a third digital data processor connected to said second digital data processor for receiving said merged images of each document and for indexing and permanently storing said merged images for later retrieval.

2. The system of claim 1, wherein said first digital data processor generates detailed document data for each of said documents and transmits said detailed document data to both said document transport system and said second digital data processor.

3. The system of claim 2, wherein said derailed document data is transmitted by said second digital data processor to said third digital data processor and is used by said third digital data processor when indexing and permanently storing said merged images of said individual documents.

4. The system of claim 1, wherein said third digital data processor includes a relational database server which stores pointers for indexing said merged images.

5. A method for processing a plurality of individual documents, each having a front and a back with images thereon, comprising the steps of:
   transporting each individual document along a transport path and obtaining MICR data and front and back image information associated with each individual document;
   transmitting said MICR data and sequential document data to a first digital data processor for controlling the transporting of each individual document along said transport path;
   transmitting said MICR and sequential document data from said first digital data processor to a second digital data processor;
   transmitting said image information associated with each individual document to said second digital data processor;
   merging said transmitted MICR and sequential document data and said image information in digitized form into merged images of the front and back of each individual document;
   transmitting speed control data between said first and second digital data processors for use by said first digital data processor to control said document transporter to a desired speed:
   transmitting said merged images of each individual document from said second digital data processor to a third digital data processor; and
   indexing and permanently storing for later retrieval said merged images of each individual document using said third digital data processor.

6. The method of claim 5, further including the step of storing temporarily said merged images of each individual document in said second digital data processor.

7. The method of claim 5, wherein said step of transporting each individual document along a transport path is performed by a document transport system.

8. The method of claim 7, further including the step of generating detailed document data using said first digital data processor for each of said individual documents and transmitting said detailed document data to both said document transport system and said second digital data processor.

9. The method of claim 8, further including the step of using said detailed document data when indexing and permanently storing said merged images.

10. The method of claim 5, wherein said third digital data processor utilizes a relational database server which stores pointers for indexing said merged documents.

11. The method of claim 5, further including the step of using said third digital data processor to determine the quantity of permanently stored merged images and to delete some of said permanently stored merged images to maintain a certain predetermined maximum quantity of permanently stored merged images.

12. The method of claim 11, further including the step of transferring said permanently stored merged images to be deleted for permanent storage in another location prior to deleting said permanently stored merged images.

* * * * *

UNITED STATES PATENT AND TRADEMARK OFFICE
CERTIFICATE OF CORRECTION

PATENT NO. : 5,602,936

DATED : February 11, 1997

INVENTOR(S) : Green et al.

It is certified that error appears in the above-indentified patent and that said Letters Patent is hereby corrected as shown below:

Column 2, line 31, change "from" to --front--.

Column 11, line 44, change "ALAN" to --A LAN--.

Column 12, line 3, change "OS2" to --OS/2--.

Column 13, line 7, change "it" to --is--;

line 29, change "from" to --front--; and line 55, change "Software" to --software--.

Column 14, line 15, change "ALAN" to --A LAN--.

Signed and Sealed this

Thirteenth Day of May, 1997

*Attest:*

BRUCE LEHMAN

*Attesting Officer*      *Commissioner of Patents and Trademarks*